United States Patent [19]

Ray et al.

[11] Patent Number: 6,015,768

[45] Date of Patent: Jan. 18, 2000

[54] PROCESS FOR PREPARATION OF A HETEROGENEOUS CATALYST USEFUL FOR PREPARATION OF SUPER HIGH MOLECULAR WEIGHT POLYMERS OF ALPHA-OLEFIN

[76] Inventors: Sabyasachi Sinha Ray, House No. B-65, Sarita Vihar, New Delhi-110044, India; Deepak Kumar Tuli, House No. 266, Sector-9; Meeta Sharma, House No. 172, Sector-9, both of Faridabad-121006, India; Madan Mohan Rai, House No. 886, Sector-15; Sobhan Ghosh, House No. 188, Sector-14, both of Faridabad, India, 121007; Akhilesh Kumar Bhatnagar, House No. 205, Sector-7A, Faridabad-121006, India; Prabhat Kumar Saxena, E-40, NCL Colony; Swaminathan Sivaram, C-11/2, NCL Colony, both of Pure 411 008, India

[21] Appl. No.: 09/064,139

[22] Filed: Apr. 22, 1998

[51] Int. Cl.[7] .......................... B01J 31/00; B01J 27/135; B01J 23/00; B01J 23/58

[52] U.S. Cl. ......................... 502/300; 502/102; 502/103; 502/104; 502/110; 502/113; 502/117; 502/134; 502/227; 502/328

[58] Field of Search ..................................... 502/100, 102, 502/103, 104, 110, 113, 115, 117, 134, 227, 300, 328

[56] References Cited

U.S. PATENT DOCUMENTS

| | | | |
|---|---|---|---|
| 4,312,782 | 1/1982 | Mink et al. | 252/429 B |
| 4,347,160 | 8/1982 | Epstein et al. | 252/429 B |
| 4,478,952 | 10/1984 | Mack et al. | 502/110 |
| 4,579,991 | 4/1986 | White | 585/524 |
| 4,650,778 | 3/1987 | Klabunde et al. | 502/8 |
| 4,740,570 | 4/1988 | Klabunde et al. | 526/125 |
| 5,118,767 | 6/1992 | Job | 526/124 |
| 5,231,065 | 7/1993 | Hawley et al. | 502/111 |
| 5,276,114 | 1/1994 | Hawley et al. | 526/115 |
| 5,294,581 | 3/1994 | Job | 502/124 |
| 5,488,022 | 1/1996 | Takashashi et al. | 502/115 |

*Primary Examiner*—Gary P. Straub
*Assistant Examiner*—Cam N. Nguyen
*Attorney, Agent, or Firm*—Venable; George H. Spencer; Charles C. Rories

[57] ABSTRACT

A process for the preparation of heterogeneous zirconium based catalyst for polymerization of alpha-olefins to super high molecular weight poly (alpha-olefins). The process comprises in mixing zirconium alcholate or phenolate with anhydrous magnesium chloride in the presence of a solvent. The mixture is heated, then cooled and an organoaluminum compound is added. Optionally, an electron donor compound is added and heated to obtain a black slurry, which is cooled and then washed with a hydrocarbon diluent.

26 Claims, No Drawings

PROCESS FOR PREPARATION OF A HETEROGENEOUS CATALYST USEFUL FOR PREPARATION OF SUPER HIGH MOLECULAR WEIGHT POLYMERS OF ALPHA-OLEFIN

FIELD OF THE INVENTION

This invention relates to a process for the preparation of a heterogeneous catalyst useful for preparation of super high molecular weight polymers of alpha-olefins, containing at least four carbon atoms or more. More specifically, the invention relates to a method for preparing such heterogeneous catalyst based on zirconium.

BACKGROUND OF THE INVENTION

High molecular weight non crystalline poly (alpha-olefin) have wide spread applications in many fields. For example poly (1-hexene) acts as viscosity index improver in lubricating oils whereas poly (1-octene) is used as drag reducing additive to reduce friction loss or drag for pumpable fluid through pipelines.

Ziegler Natta catalysts are used for polymerization of olefins at moderate temperature and pressure. The catalyst generally comprises of a transition metal halide such as titanium trihalide or tetrahalide and an organoaluminum compound such as alkyl aluminum or alkyl aluminum halide. The transition metal compound can be supported on an inorganic or organic support.

There are many heterogeneous catalysts cited in prior art which polymerize alpha-olefin containing four or more carbon atoms. For example U.S. Pat. No. 4,613,712 discloses a catalyst composition prepared by treatment of silica with ethyl magnesium chloride in tetrahyrofuran and treatment with excess titanium tetrachloride. This catalyst was used for the polymerization of 1-hexene, 1-octene, and 1-decene at 70° C. using triethyl aluminum as cocatalyst. European Patent 281,924 discloses a catalyst composition prepared by treatment of magnesium chloride ethanol adduct with titanium alkoxide in decane at 80° C. followed by addition of diethyl aluminum chloride. The catalyst was used for polymerizing 1-butene, 1-hexene, and 1-octene in n-heptane as diluent at 50° C. U.S. Pat. No. 528,117 describes a catalyst using transition metal alcholate, magnesium chloride and an aliphatic ester in hydrocarbon medium. The catalyst was used for polymerization of ethylene and copolymerization with alpha-olefins.

However these catalysts described in prior art does not provide super high molecular weight poly(alpha-olefin) suitable as drag reducer in pipelines. U.S. Pat. No. 4,415,714 discloses a catalyst, namely, $TiCl_3$, $1/3AlCl_3$ along with diethyl aluminum chloride for the preparation of super high molecular weight polyolefin suitable as drag reducer. Furthermore, U.S. Pat. No. 4,493,904 describes polymerization of 1-octene using $TiCl_3.1/3AlCl_3$ along with diethyl aluminum chloride as cocatalyst and diethylether as electron donor. Similarly U.S. Pat. No. 4,433,123 and U.S. Pat. No. 4,358,572 describes preparation of super high molecular weight poly (1-octene) suitable as drag reducer using same catalyst/cocatalyst combination. U.S. Pat. No. 4,384,089 describes copolymerization of 1-decene and 1-butene using $TiCl_3.1/3AlCl_3$/diethyl aluminum chloride catalyst system.

However, catalysts based on $TiCl_3.1/3AlCl_3$/Diethyl aluminum chloride suffer from many drawbacks as follows:

1. These catalysts leave high chloride residue in the product which is undesirable in further applications.

2. This requires expensive processing steps for neutralization of chloride.

3. also use of diethylaluminum chloride containing catalyst, cause evolution of HCI during the catalyst destruction step.

4. Furthermore handling of $TiCl_3.1/3AlCl_3$, is rendered difficult in view of its extreme sensitivity of oxygen and corresponding deactivation.

OBJECTS OF THE INVENTION

An object of the present invention is to propose a process for the preparation of a heterogeneous catalyst capable of polymerizing alpha olefins to a high molecular weight hydrocarbon soluble, non-crystalline polymers and copolymers.

Another objective of the present invention is to minimize the reactive chlorine in total catalyst system.

DESCRIPTION OF THE INVENTION

According to this invention there is provided a process for the preparation of heterogeneous zirconium based catalyst useful for polymerization of alpha-olefins to high molecular weight poly alpha-olefins which comprises in the steps of:

a) mixing zirconium alkoxide or aryloxide with anhydrous magnesium chloride in an inert diluent to form a zirconium-magnesium compound in the form of a slurry, and;

b) treating the zirconium-magnesium compound with an organoaluminum compound and, optionally, an electron donor compound.

In an embodiment of present invention the catalyst component comprises of a) Anhydrous magnesium chloride with a surface area between 30 to 100 m$^2$/g.

b) Zirconium alcholate/phenolate of the general formula $Zr(OR')_4$ wherein R' denotes a straight chain or branched alkyl group containing 1 to 8 carbon atoms or an aryl or substituted aryl group, such as phenyl, p-methylphenyl, p-methoxyphenyl, 2,4,6 bromophenyl and 2,4,6-triethoxyphenyl groups.

c) An organoaluminum compound of general formula $AlR_nCl_{3-n}$ wherein n is between 0.5–2.0.

d) and optionally an electron donor compound selected from a broad class of organic compounds containing oxygen, sulfur and nitrogen groups. Typical examples are dialkyl and diaryl ethers, esters, nitrile containing compounds such as acetonitrile and benzonitrile.

The hydrocarbon diluent is selected from paraffin of general formula $C_nH_{2n+2}$ or $C_nH_{2n}$ wherein n is an integer from 2 to 12.

The mol ratio of magnesium to zirconium is 10 to 20, preferably, between 14 to 16.

The mol ratio of Al/Zr is 8 to 16 preferably between 11 to 13.

The mol ratio of transition metal/electron donor compound is between 0.1 to 2, preferably, between 0.5 to 1, when an electron donor compound is used. After addition of organoaluminum compound, the temperature of reaction mixture is maintained 60–100° C. for a period of one to six hours, preferably, between 80–90° C. for one to two hours.

The catalyst thus prepared is used as a slurry in hydrocarbon. Typically the catalyst has 3 to 6 weight % zirconium, 20 to 25 weight % magnesium and 50 to 55 weight % chlorine.

The catalyst prepared according to the process of the present invention can be used to polymerize alpha olefins of general formula $C_nH_{2n}$ where n is an integer between four to fourteen. The alpha olefins can be used alone or in combination with each other. In the later case the products formed are copolymers of alpha olefins.

The process employed for polymerization of alpha olefins are known in the art. The process can be operated either in presence of a solvent or in bulk, wherein part of alpha olefin itself is used as solvent. Such processes are described in Europ.Pat. 223889, U.S. Pat. No. 5,276,116, U.S. Pat. No. 4,527,581, U.S. Pat. No. 4,289,679 and U.S. Pat. No. 4,945,142 which are incorporated herein as references. Typically polymerization using the catalysts of the present invention are conducted in the temperature range −10 to +40° C. The cocatalyst used is a trialkyl aluminum of formula $Al(R)_3$, where $R=CH_3$, $i-C_4H_9$ and $C_8H_{18}$. Typically the mol ratio of Al/Zr in polymerization is kept between 2–10.

The process of the present invention is described hereinbelow with reference to examples which are illustrative only and should not be construed to limit the scope of the present invention in any manner.

EXAMPLE 1

In a three necked 250 ml reactor equipped with a magnetic bar nitrogen inlet and outlet addition funnel and a condenser 100 ml of dry n-hexane was added followed by 1.63 g zirconium (IV) n-butoxide and 6.2 g of anhydrous magnesium chloride. The mixture was stirred at 80° C. for one hour. The temperature was brought to 40° C. and 6.2 g of diethyl aluminum chloride in 20 ml of n-hexane was added in half an hour. The temperature was raised to 80° C. and maintained for two hours. The black slurry was cooled to room temperature and washed with three portions of dry n-hexane each of 50 ml. Finally the solid was suspended in 50 ml of dry n-hexane. The catalyst was analyzed for magnesium and chlorine by EDTA and Vollhard titration respectively. The zirconium was estimated by inductively coupled plasma (ICP). The catalyst component contained following percentage by weight. Magnesium 21.5; Chlorine 55.3; Zirconium 4.6.

EXAMPLE 2

In a three necked 25 ml reactor equipped with a magnetic bar nitrogen inlet and outlet addition funnel and a condenser 100 ml of dry n-hexane was added followed by 1.39 g zirconium (IV) n-propoxide and 6.2 g of anhydrous magnesium chloride. The mixture was stirred at 80° C. for one hour. The temperature was brought to 40° C. and 6.2 g of diethyl aluminum chloride in 20 ml of n-hexane was added in half an hour. The temperature was raised to 80° C. and maintained for two hours. The black slurry was cooled to room temperature and washed with dry n-hexane three times. Finally the solid suspended in 50 ml of dry n-hexane. The catalyst was analyzed for magnesium and chlorine by EDTA and Vollhard titration respectively. The zirconium was estimated by inductively coupled plasma. The catalyst component contained following percentage by weight. Magnesium 20.5; Chlorine 54.3; Zirconium 4.9.

EXAMPLE 3

In a three necked reactor equipped with a magnetic bar nitrogen inlet and outlet addition funnel and a condenser 100 ml of dry n-hexane was added followed by 1.15 g zirconium (IV) ethoxide and 6.2 g of anhydrous magnesium chloride. The mixture was stirred at 80° C. for one hour. The temperature was brought to 40° C. and 6.2 g of diethyl aluminum chloride in 20 ml of n-hexane was added in half an hour. The temperature was raised to 80° C. and maintained for two hours. The black slurry was cooled to room temperature and washed with dry n-hexane three times. Finally the solid was suspended in 50 ml of dry n-hexane. The catalyst was analyzed for magnesium and chlorine by EDTA and Vollhard titration respectively. The zirconium was estimated by inductively coupled plasma. The catalyst component contained following percentage by weight. Magnesium 20.8; Chlorine 54.2; Zirconium 5.1.

EXAMPLE 4

In a three necked 250 ml reactor equipped with a magnetic bar nitrogen inlet and outlet addition funnel and a condenser 100 ml of dry n-hexane was added followed by 1.63 g zirconium (IV) n-butoxide and 6.2 g of anhydrous magnesium chloride. The mixture was stirred at 80° C. for one hour. The temperature was brought to 40° C. and 12.71 g of ethyl aluminum sesquichloride in 20 ml of n-hexane was added in half an hour. The temperature was raised to 80° C. and maintained for two hours. The black slurry was cooled to room temperature and washed with three portions of dry n-hexane each of 50 ml. Finally the solid was suspended in 50 ml of dry n-hexane. The catalyst was analyzed for magnesium and chlorine by EDTA and Vollhard titration respectively. The zirconium was estimated by inductively coupled plasma (ICP). The catalyst component contained following percentage by weight. Magnesium 20.8; Chlorine 54.3; Zirconium 4.8.

EXAMPLE 5

In a three necked 250 ml reactor equipped with a magnetic bar nitrogen inlet and outlet addition funnel and a condenser 100 ml of dry n-hexane was added followed by 1.39 g zirconium (IV) n-propoxide and 6.2 g of anhydrous magnesium chloride. The mixture was stirred at 80° C. for one hours. The temperature was brought to 40° C. and 12.71 g of ethyl aluminum sesquichloride in 20 ml of n-hexane was added in half an hour. The temperature was raised to 80° C. and maintained for two hours. The black slurry was cooled to room temperature and washed with dry n-hexane three times. Finally the solid was suspended in 50 ml of dry n-hexane. The catalyst was analyzed for magnesium and chlorine by EDTA and Vollhard titration respectively. The zirconium was estimated by inductively coupled plasma. The catalyst component contained following percentage by weight. Magnesium 21.8; Chlorine 55.3; zirconium 4.7.

EXAMPLE 6

In a three necked reactor equipped with a magnetic bar nitrogen inlet and outlet addition funnel and a condenser 100 ml of dry n-hexane was added followed by 1.15 g zirconium (IV) ethoxide and 6.2 g of anhydrous magnesium chloride. The mixture was stirred at 80° C. for one hour. The temperature was brought to 40° C. and 12.71 g of ethyl aluminum sesquichloride in 20 ml of n-hexane was added in half an hour. The temperature was raised to 80° C. and maintained for two hours. The black slurry was cooled to room temperature and washed with dry n-hexane three times. Finally the solid was suspended in 50 ml of dry n-hexane. The catalyst was analyzed for magnesium and chlorine by EDTA and Vollhard titration respectively. The zirconium was estimated by inductively coupled plasma. The catalyst component contained following percentage by weight. Magnesium 21.6; Chlorine 55.2; Zirconium 5.1.

EXAMPLE 7

A general procedure for polymerization of alpha olefins using catalysts of present invention is illustrated below.

A 250 ml round bottomed flask is equipped with a septum is dried under vacuum with intermittent purging of dry argon. 100 ml of dry 1-octene was added to it through septum followed by 0.2176 g of triisobutyl aluminum and 50 mg of zirconium containing slurry of catalyst prepared in example-1 (Al/Zr 2). The polymerization is carried out for 24 hours by rolling the flask gently. The flask remained dipped in a thermoragulated bath at 0° C. The polymerization was terminated by adding acidified methanol.

The inherent viscosity $\eta_{inh}$ was determined for each polymer using a Cannon-Ubbelohde four bulb shear dilution viscometer (0.1 g polymer/100 ml LPA solvent at 25° C.). Inherent viscosities were calculated at shear rate of 300 sec$^1$.

Drag reduction measurements were made in Capillary Flow Apparatus (CFA). It contains a 50 cm. long capillary of 3 mm internal diameter. The diesel oil was used as test fluid. In test diesel was passed through capillary at constant pressure of 1.5 kg/cm$^2$ at temperature 25° C. in 5 to 10 seconds. The volumes of liquid flowed through the capillary was measured. The percent throughout increase (% TI) is calculated as $$\% \, TI = \left(\frac{(Q_2 - Q_1)}{Q_1}\right) \times 100$$

Where $Q_1$ is the volume of diesel oil (without additive) and $Q_2$ is the volume of diesel oil (with additive) collected in same time.

The % drag reduction (% DR) is calculated as $$\% \, DR = \left\{1 - \left[\frac{1}{1 + (\% \, TI/100)}\right]^{1.75}\right\} \times 110$$

The results of polymerization and testing are shown in table 1

TABLE 1

Polymerization and testing of alpha olefins using supported catalysts

| S.No. | Catalyst | Co-catalyst | Olefin | Inherent viscosity at shear rate 300 sec$^{-1}$ | % drag reduction at 6 ppm dosage level (in diesel) |
|---|---|---|---|---|---|
| 1 | Example 1 | Triisobutyl aluminum | 1-octene | 11.3 | 24 |
| 2 | Example 1 | Triisobutyl aluminum | 1-decene | 11.2 | 24 |
| 3 | Example 4 | Trioctyl aluminum | 1-octene | 10.8 | 22 |

We claim:

1. A process for the preparation of heterogeneous zirconium based catalyst useful for polymerization of alpha-olefins to high molecular weight poly alpha-olefins which consists essentially of the steps of:
   a) mixing zirconium alkoxide or aryloxide with anhydrous magnesium chloride in an inert diluent under dry conditions and heating the mixture to a temperature of 60–100° C. for 1 to 6 hours to form a zirconium-magnesium compound in the form of a slurry,
   b) treating the zirconium-magnesium compound with an organoaluminum compound and heating the zirconium-magnesium compound with said organoaluminum compound to a temperature of 60–100° C. for 1 to 6 hours, and
   c) recovering said catalyst.

2. The process of claim 1 wherein the mole ratio of magnesium to zirconium ranges from 10 to 20.

3. The process of claim 2, wherein the mole ratio of magnesium to zirconium ranges from 14 to 16.

4. The process of claim 1 wherein the mole ratio of Al/Zr ranges from 8 to 16.

5. The process of claim 4 wherein the mole ratio of Al/Zr ranges from 11 to 13.

6. The process of claim 1 wherein the inert diluent is selected from n-pentane, n-hexane, n-heptane, cyclohexane, and decalin.

7. The process of claim 1 wherein zirconium alkoxide has the formula Zr(OR')$_4$ where R' denotes a straight chain or branched alkyl group containing 1 to 8 carbon atoms, or an aryl or substituted aryl group.

8. The process of claim 1 wherein the zirconium aryloxide has the general formula Zr(OAr)$_4$ where Ar is an aryl or substituted aryl group.

9. The process of claim 8, wherein Ar is selected from phenyl, p-methylphenyl, p-methoxyphenyl, 2,4,6 bromophenyl, and 2,4,6-triethoxyphenyl groups.

10. The process of claim 1 wherein said organoaluminum compound is an aluminum alkyl halide having the formula AlR$_n$Cl$_{3-n}$, wherein R is a hydrocarbon radical and n ranges from 0.5 to 2.0.

11. The process of claim 1 wherein anhydrous magnesium chloride has a surface area that ranges from 30 to 100 m$^2$/g.

12. A process for the preparation of heterogeneous zirconium based catalyst useful for polymerization of alpha-olefins to high molecular weight poly alpha-olefins which consists essentially of the steps of:
   a) mixing zirconium alkoxide or aryloxide with anhydrous magnesium chloride in an inert diluent under dry conditions and heating the mixture to a temperature of 60–100° C. for 1 to 6 hours to form a zirconium-magnesium compound in the form of a slurry,
   b) treating the zirconium-magnesium compound with an organoaluminum compound and an electron donor compound selected from organic compounds containing oxygen, sulfur, and nitrogen groups, and heating the zirconium-magnesium compound with said organoaluminum compound and said electron donor compound to a temperature of 60–100° C. for 1 to 6 hours, and
   c) recovering said catalyst.

13. The process of claim 12 wherein the ratio of zirconium to electron donor ranges from 0.1 to 2.0.

14. The process of claim 13 wherein the ratio of zirconium to electron donor ranges from 0.5 to 1.

15. The process of claim 12 wherein the electron donor is an organic compound selected from dialkyl and diaryl ethers, esters, and nitrile-containing compounds.

16. The process of claim 15 wherein the electron donor is a nitrile-containing compound selected from acetonitrile and benzonitrile.

17. The process of claim 12 wherein the mole ratio of magnesium to zirconium ranges from 10 to 20.

18. The process of claim 17 wherein the mole ratio of magnesium to zirconium ranges from 14 to 16.

19. The process of claim 12 wherein the mole ratio of Al/Zr ranges from 8 to 16.

20. The process of claim 19 wherein the mole ratio of Al/Zr ranges from 11 to 13.

21. The process of claim 12 wherein the inert diluent is selected from n-pentane, n-hexane, n-heptane, cyclohexane, and decalin.

22. The process of claim 12 wherein zirconium alkoxide has the formula $Zr(OR')_4$, where R' denotes a straight chain or branched alkyl group containing 1 to 8 carbon atoms, or an aryl or substituted aryl group.

23. The process of claim 12 wherein the zirconium aryloxide has the general formula $Zr(OAr)_4$, where Ar is aryl or substituted aryl group.

24. The process of claim 23 wherein Ar is selected from phenyl, p-methylphenyl, p-methoxyphenyl, 2,4,6 bromophenyl, and 2,4,6-triethoxyphenyl groups.

25. The process of claim 12 wherein said organoaluminum compound is an aluminum alkyl halide having the formula $AlR_nCl_{3-n}$, wherein R is a hydrocarbon radical and n ranges from 0.5 to 2.0.

26. The process of claim 12 wherein anhydrous magnesium chloride has a surface area that ranges from 30 to 100 $m^2/g$.

* * * * *